United States Patent [19]

Goebert et al.

[11] Patent Number: 4,547,267
[45] Date of Patent: Oct. 15, 1985

[54] PROCESS FOR PRODUCING A PHOTOOPTICAL SHUTTER BLADE FOR AN OPTICAL INSTRUMENT

[75] Inventors: Klaus Goebert; Ulrich Buering, both of Wetzlar, Fed. Rep. of Germany

[73] Assignee: Ernst Leitz Wetzlar GmbH, Wetzlar, Fed. Rep. of Germany

[21] Appl. No.: 525,874

[22] Filed: Aug. 24, 1983

[30] Foreign Application Priority Data

Dec. 24, 1981 [DE] Fed. Rep. of Germany ....... 3151290
Dec. 22, 1982 [WO] PCT Int'l Appl. . PCT/DE82/00232

[51] Int. Cl.⁴ ................................................. C25D 1/20
[52] U.S. Cl. ...................................................... 204/4
[58] Field of Search .................................. 204/3, 4, 12

[56] References Cited

U.S. PATENT DOCUMENTS 3,853,714 12/1974 Shimada ................................... 204/4
4,243,495 1/1981 Trott ...................................... 204/12
4,422,905 12/1983 Becker .................................... 204/9

FOREIGN PATENT DOCUMENTS 2828625 9/1979 Fed. Rep. of Germany ........ 204/12

OTHER PUBLICATIONS

Kodak Publication No. P-79, "What is Photofabrication", 1980.

Primary Examiner—Thomas Tufariello
Attorney, Agent, or Firm—Schwartz, Jeffery, Schwaab, Mack, Blumenthal & Evans

[57] ABSTRACT

The blades for optical shutters of cameras, lenses or the like are obtained from a sheet made by electrodeposition, for example a nickel sheet. Thereby, subsequent working operations such as hammering, riveting may be carried out on the whole sheet. The sheet has a series of individual blades which are obtained on their peripheries by small lugs and which may be readily detached from the rest of the sheet.

1 Claim, 2 Drawing Figures

PROCESS FOR PRODUCING A PHOTOOPTICAL SHUTTER BLADE FOR AN OPTICAL INSTRUMENT

CROSS REFERENCE TO RELATED APPLICATION

This application is a continuation pursuant to 35 USC 120 of our prior international application No. PCT/DE 82/00232, which was filed on Dec. 22, 1982 and which designates the United States of America.

BACKGROUND OF THE INVENTION

The present invention relates to a blade for the photooptical shutters of optical instruments, for example, photographic cameras or photographic objectives.

Blades of this type had been made heretofore mainly of steel, in particular from spring steel strip by stamping. The blades obtained as individual parts must be deburred and, in order to prevent surface reflections, provided with a black, matte or no-gloss coating and prior to that suitably prepared for this working process. Furthermore, the blades require adequate mechanical stability in view of the intermittently occurring high forces during acceleration and braking, particularly in the areas of the recesses for support and control purposes. The said recesses are therefore provided with rivetted reinforcements, which again require a considerable expenditure of time in the case of the blades which are present individually.

In view of the relatively high production costs, shutter blades made of a thermoplastic synthetic plastic material have become known. These may be produced in a single working step in an injection molding tool. In the process, several shutter blades may be produced in a single working step simultaneously and provided with a matte surface by means of the surface treatment of the cavities of the tool by sand blasting, etching or the like. The supporting journals, pins or the like provided for the support and control of the shutter blades are injection molded right into the part. However, the durability and hardness of such plastic blades is less than those of steel blades.

SUMMARY OF THE INVENTION

It is therefore the object of the invention to provide a blade, which on the one hand is capable of satisfying high requirements with respect to resistance, hardness and mechanical strength against mechanical effects, i.e. the same requirements satisfied by the known steel blades, and on the other, may be produced economically, i.e. without an excessive manufacturing effort.

It is also an object of the invention to provide an optical device having an improved shutter blade in accordance with the present invention.

These objects are attained according to the invention in that the blade consists of a electrolytically produced foil. The advantages obtained by the invention in particular consist of the fact that a plurality of blades is present in the foil and remains therein until all of the subsequent processing steps, such as surface treatments and rivetting are completed. In this manner individual blades may be produced at a lower cost. Furthermore, metals conventionally produced electrolytically are corrosion resistant so that corrosion phenomena are not to be expected at uncoated locations of the surface of the blades.

According to one embodiment of the invention, the foil contains a plurality of blades held by separable webs, together with the corresponding surrounding area. Following the surface treatment and the rivetting, it is merely necessary to remove the blades from surroundings; they may then be packaged automatically. To apply the rivets, every blade is equipped, according to a further development of the invention, with recesses for support and control purposes. The rivets are inserted conveniently by means of NC (numerically controlled) automatic machines.

Nickel has been found to be especially advantageous as the material of the electrolytically produced foil. The corrosion resistance of nickel is excellent and it is also hard and durable. The sharpness of the outline of blades made of nickel by electrolytic means is excellent.

The blades may be produced by preparing a photo master with the aid of a drawing corresponding to the foil to be produced and by exposing a metal surface coated with a photosensitive material through said master, whereby by means of electrolytic deposition the foil is produced on the metal surface. In the metal foil the configuration of the blade drawn on the master is represented as in interruption of the deposit, and the individual blades are connected with the surrounding area merely by narrow webs almost in a point-like manner.

Further objects, features and advantages of the invention will become apparent from the detailed description of preferred embodiments which follows, when considered in light of the attached figures of drawing.

BRIEF DESCRIPTION OF THE DRAWING

The drawing schematically illustrates an example of one embodiment of the invention.

In the drawing.

DETAILED DESCRIPTION OF PREFERRED EMBODIMENTS

Figure 1:
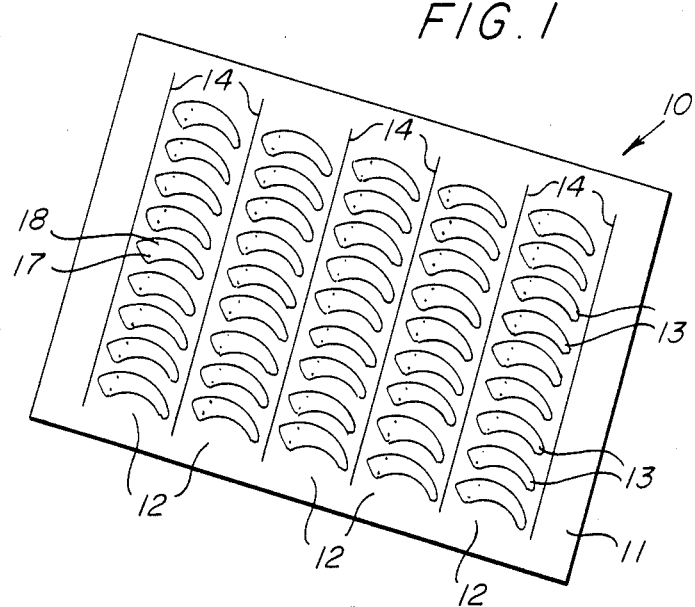
FIG. 1 shows a electrolytically produced foil with blades arranged therein, in a perspective view.
Figure 2:
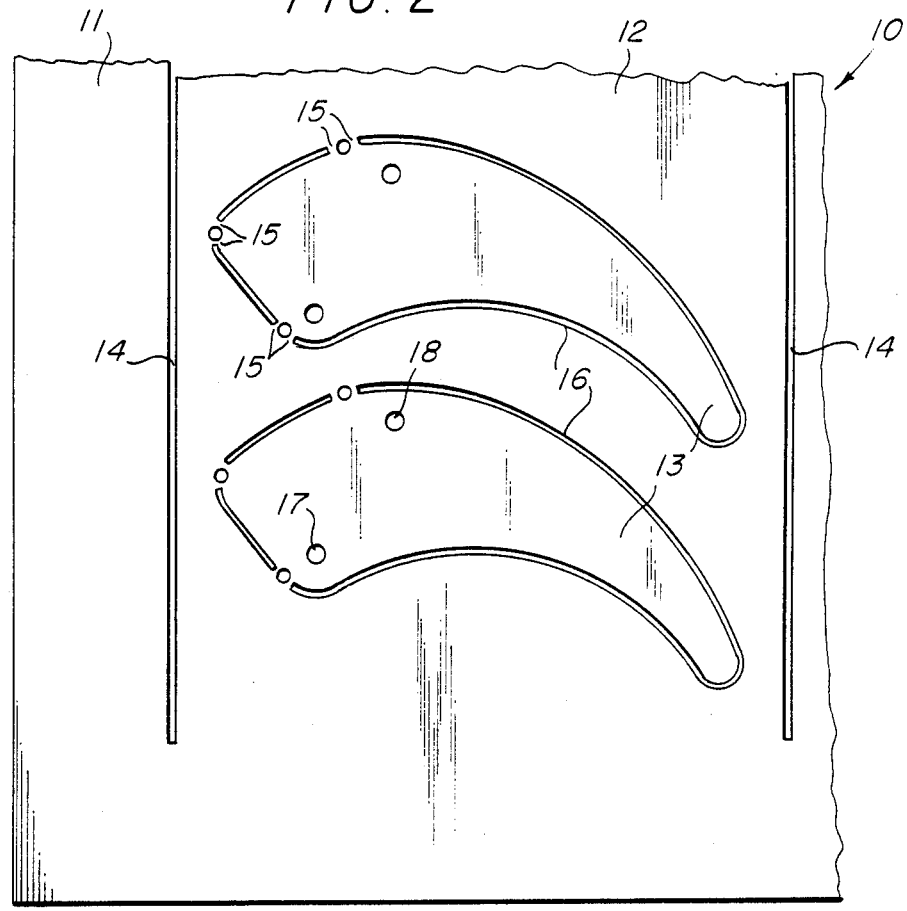
FIG. 2 is a top view of a section according to FIG. 1 with two blades and the surrounding area in a slightly enlarged representation.

FIG. 1 shows a electrolytically produced foil 10, for example a nickel foil. The foil 10 includes a surrounding area 11, in which in a plurality of parallel rows 12 the individual blades 13 are arranged in succession. The individual rows 12 are separated from each other by linear interruptions 14, which terminate shortly in front of the narrow sides of the foil 10. The individual blades 13 are connected by means of webs 15 with the surrounding area 11, while the configuration of the blades is formed in each case by curved interruptions 16 in the surface of the foil.

The blades 13 are provided with circular recesses 17, 18 for support and control purposes, specifically here the recess 17 forms the point of support, around which the blade 13 is rotated. The recesses 17, 18 are provided for reinforcement with rivets, not shown.

The production of the blades is effected according to the invention as described hereinbelow:

On a two-layer sheet of a synthetic plastic material, one layer whereof is colored, a drawing of the subsequent foil 10 is prepared. In the colored layer the intended shape, i.e., the curved interruptions are scribed in by means of a graving tool. This plastic foil is then photographed. The film image produced in this manner then serves as the subsequent photomaster, which is placed onto a metal plate coated with a photosensitive material. Following the exposure of the metal plate, the unexposed locations of the photosensitive layer are removed from the plate by washing. The plate then serves as the cathode and is inserted in a galvanic bath containing a nickel salt. Nickel is deposited in the unexposed locations and the foil desired is formed, from which the metal plate is readily separated, said foil displaying an accurate reproduction of the photomaster.

Subsequently, the foil desired is provided entirely with a black, matte surface, for example lacquered or black chromed galvanically and then equipped with rivets in the recesses 17, 18. Until the final stamping of the individual blades and the packaging, the entire foil with its numerous blades is processed simultaneously in accordance with this method.

Variants of the aforedescribed production process are possible. Thus, for example, in place of the film image a finished nickel foil may be used as the photomaster.

What is claimed is:
1. A process for producing a photooptical shutter blade for an optical instrument, comprising the steps of:
   preparing a photomaster of a plurality of blades to be produced, including openings in the blades, and connecting lugs;
   exposing a metallic plate coated with a photosensitive material through the photomaster;
   developing the exposed surface to produce a plurality of images of the blades to be produced, including openings in the blades, and connecting lugs;
   electrodepositing a metallic foil on the developed surface to produce a plurality of blades, openings in the blades, a background area, and connecting lugs for connecting the blades to the background area;
   carrying out at least one treatment step on said plurality of blades while connected to the metallic foil;
   providing rivets for the openings in the blades; and
   separating the individual blades from said foil.

* * * * *